US012687744B2

(12) United States Patent (10) Patent No.: US 12,687,744 B2
Giraudet et al. (45) Date of Patent: Jul. 21, 2026

(54) LENS ELEMENT WITH IMPROVED VISUAL PERFORMANCE

(71) Applicant: Essilor International, Charenton-le-Pont (FR)

(72) Inventors: Guillaume Giraudet, Orleans (FR); David Rio, Gometz-le-Chatel (FR); Matthieu Guillot, Issy les Moulineaux (FR); Samy Hamlaoui, Paris (FR); Bruno Fermigier, Maisons-Alfort (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 728 days.

(21) Appl. No.: 17/959,801

(22) Filed: Oct. 4, 2022

(65) Prior Publication Data

US 2023/0104969 A1 Apr. 6, 2023

(30) Foreign Application Priority Data

Oct. 5, 2021 (EP) .................................... 21306394

(51) Int. Cl.
G02C 7/04 (2006.01)

(52) U.S. Cl.
CPC .................................... G02C 7/049 (2013.01)

(58) Field of Classification Search
CPC .... G02C 7/049; G02C 2202/24; G02C 7/027; G02C 7/04; G02C 7/022
See application file for complete search history.

(56) References Cited

U.S. PATENT DOCUMENTS

2006/0030938 A1* 2/2006 Altmann ............... A61F 2/1637
623/6.37
2013/0278888 A1 10/2013 Bakaraju et al.
(Continued)

FOREIGN PATENT DOCUMENTS

WO WO 2013/149303 A1 10/2013
WO WO 2020/014613 A1 1/2020
WO WO 2020/180817 A1 9/2020

OTHER PUBLICATIONS

Extended European Search Report issued Mar. 25, 2022 in European Application 21306394.4 filed on Oct. 5, 2021, 12 pages (with Written Opinion).
(Continued)

*Primary Examiner* — William R Alexander
*Assistant Examiner* — Gabriel A Sanz
(74) *Attorney, Agent, or Firm* — Oblon, McClelland, Maier & Neustadt, L.L.P.

(57) ABSTRACT

A lens element to be worn by a wearer and to provide a refractive power based on a prescription of the wearer is provided for correcting an abnormal refraction of the eye of the wearer, the lens element including: an optical microstructure having an optical function of not focusing an image on a retina of the eye of the wearer so as to slow down progression of the abnormal refraction of the eye of the wearer, in which a modulation transfer function of the lens element is greater or equal to 0.07 over a range of spatial frequencies from 10 to 25 cycles per degree, when measured through the optical microstructure for a pupil aperture of 4 mm centered at 6.6 mm from the optical center of the lens element. A computer-implemented method for determining a lens element to be worn by a wearer is also provided.

20 Claims, 5 Drawing Sheets

(56)     References Cited

U.S. PATENT DOCUMENTS

| | | | |
|---|---|---|---|
| 2014/0135919 A1* | 5/2014 | Gontijo | A61F 2/1637 |
| | | | 623/6.24 |
| 2015/0092157 A1* | 4/2015 | Tessieres | G02C 7/028 |
| | | | 351/159.42 |
| 2015/0153587 A1 | 6/2015 | Bakaraju et al. | |
| 2015/0185501 A1 | 7/2015 | Bakaraju et al. | |
| 2015/0320547 A1 | 11/2015 | Rosen et al. | |
| 2016/0377884 A1* | 12/2016 | Lau | G02C 7/041 |
| | | | 351/159.05 |
| 2017/0115508 A1 | 4/2017 | Bakaraju et al. | |
| 2017/0212363 A1 | 7/2017 | Bakaraju et al. | |
| 2018/0318065 A1 | 11/2018 | Rosen et al. | |
| 2018/0335648 A1 | 11/2018 | Bakaraju et al. | |
| 2019/0227344 A1 | 7/2019 | Bakaraju et al. | |
| 2019/0235278 A1 | 8/2019 | Bakaraju et al. | |
| 2020/0214831 A1 | 7/2020 | Rosen et al. | |
| 2021/0191157 A1 | 6/2021 | Bakaraju et al. | |
| 2021/0271110 A1 | 9/2021 | Bakaraju et al. | |
| 2021/0311326 A1* | 10/2021 | Wyss | G02C 7/04 |
| 2021/0382326 A1* | 12/2021 | Kubota | G02C 7/083 |
| 2022/0011602 A1* | 1/2022 | Chalberg, Jr. | G02C 7/16 |
| 2022/0035179 A1 | 2/2022 | Rappon et al. | |

OTHER PUBLICATIONS

Bian et al., "Design of multizone soft contact lens to slow myopia progression", Proceedings of SPIE, vol. 10815, 2018, 7 pages.
Collins et al., "Retinal image quality, reading and myopia", Vision Research 46, 2006, pp. 196-215.

* cited by examiner

|  | VSOTF |
| --- | --- |
| SVL | 0.95 |
| L1 | 0.49 |
| L2 | 0.3 |

|  | 0 month | 6 months | 12 months | 18 months | 24 months |
|---|---|---|---|---|---|
| L1 | 0.00 mm | 0.09 mm | 0.14 mm | 0.26 mm | 0.35 mm |
| L3 | 0.00 mm | 0.13 mm | 0.24 mm | 0.39 mm | 0.50 mm |
| SVL | 0.00 mm | 0.20 mm | 0.36 mm | 0.57 mm | 0.68 mm |

LENS ELEMENT WITH IMPROVED VISUAL PERFORMANCE

FIELD OF THE INVENTION

The present invention pertains to the field of ophthalmic lens.

More specifically, the present invention relates to a lens element intended to be worn by a wearer in order to suppress or slow down progression of an abnormal refraction while preserving visual performance of the wearer.

BACKGROUND OF THE INVENTION

Several solutions exist for suppressing or slowing down progression of an abnormal refraction.

WO2012/034265 discloses a first solution for retarding the progression of myopia by providing a concentric annular multi-zone refractive lens including at least one correcting zone of optical power for correcting refractive error and at least one defocusing zone for projecting at least one non-homogenous defocused image in front of at least a part of a retina to inhibit myopic eye growth, wherein the correcting and defocusing zones are alternated and wherein the lens has a central zone that is a circular first correcting zone.

US2017/0131567 discloses a second solution to suppress progression of myopia by providing a spectacle lens comprising a first correcting area and a plurality of independent island-shaped areas in the vicinity of a center part of the lens configured to focus an image on a position other than a retina of the eye.

WO2019/1666653 disclose a third solution to slow down the progression of an abnormal refraction of the eye by providing a lens element comprising a central prescription portion and a plurality of optical elements having a non-spherical optical function.

WO2019/152438 discloses a fourth solution for treating eye-length disorder by providing an ophthalmic lens comprising a scattering region surrounding a clear aperture.

All these solutions comprise a clear central zone surrounded by an optical microstructure in the peripheral visual field to slow down the abnormal refraction progression. The clear central zone is free optical elements and show no effect on visual performance. However, the optical microstructure in the peripheral visual field affects the visual performance of the lens element.

Recent controlled clinical trials provided evidence of the benefit of peripheral optical microstructure to slow down the progression of an abnormal refraction if the lens element is worn for a sufficient time per day by the wearers—usually children (Bao, Yang, Huang, Li, Pan, Ding, Lim, Zheng, Spiegel, Drobe, Lu, Chen. One-year myopia control efficacy of spectacle lenses with aspherical lenslets. British Journal of Ophthalmology, 2021, 0, 1-6). In normal, straight viewing conditions, children using spectacle lenses with optical microstructure in the periphery will look through the central clear zone, which has no impact on visual performance. However, eye movements and possible position shifts of the spectacle frame make it possible that the visual axis passes through the optical microstructure. In such case, the reduced visual performance may negatively affect the wearing time thus limiting the benefit of the lens.

Accordingly, there is a need to provide a lens element comprising a peripheral optical microstructure for suppressing or slowing down the progression of an abnormal refraction of the wearer while preserving the visual performance of the lens element.

The present invention lies within this context.

SUMMARY OF THE INVENTION

According to a first aspect of the invention, there is provided a lens element intended to be worn by a wearer and to provide a refractive power based on a prescription of the wearer for correcting an abnormal refraction of the eye of the wearer; wherein the lens element comprises an optical microstructure having an optical function of not focusing an image on the retina of the eye of the wearer so as to slow down progression of the abnormal refraction of the eye of the wearer; and wherein the modulation transfer function of the lens element, for example for foveal vision, is greater or equal to 0.07, preferably greater or equal to 0.10, over the range of spatial frequencies comprised from 10 to 25 cycles per degree, when measured through the optical microstructure for a pupil aperture of 4 mm centered at 6.6 mm from the optical center of the lens element. Such position of the pupil may correspond to a gaze direction of 15° in standard wearing conditions.

Advantageously, as detailed below, the range of values of the modulation transfer function, for example for foveal vision, ensures that the visual performance of the lens element will be preserved during reading activities.

According to other embodiments, the proposed lens element may also comprise at least one of the following additional features:

the lens element further comprises a refractive area configured to provide the refractive power based on the prescription of the wearer for correcting the abnormal refraction of the eye of the wearer.

the optical microstructure has an additional optical function of providing the refractive power based on the prescription of the wearer for correcting the abnormal refraction of the eye of the wearer.

the modulation transfer function, for example for foveal vision, is greater or equal to 0.15, preferably greater or equal to 0.25 over the range of spatial frequencies comprised from 10 to 15 cycles per degree, when measured through the optical microstructure for a pupil aperture of 4 mm centered at 6.6 mm from the optical center of the lens element.

the modulation transfer function, for example for foveal vision, is greater or equal to 0.07, preferably greater or equal to 0.10, over the range of spatial frequencies comprised from 20 to 25 cycles per degree, when measured through the optical microstructure for a pupil aperture of 4 mm centered at 6.6 mm from the optical center of the lens element.

the modulation transfer function, for example for foveal vision, is greater or equal to 0.70, preferably greater or equal to 0.85, over the range of spatial frequencies comprised from 0.5 to 3 cycles per degree, when measured through the optical microstructure for a pupil aperture of 4 mm centered at 6.6 mm from the optical center of the lens element.

the modulation transfer function, for example for foveal vision, is a horizontal modulation transfer function or a vertical modulation transfer function, preferably a horizontal modulation transfer function.

the optical microstructure is disposed on the object-side surface and/or the eye-side surface and/or between the object-side surface and the eye-side surface of the lens element.

the lens element comprises a coating on the object-side surface and/or the eye-side surface.

the optical microstructure comprises a plurality of optical elements, such as for instance micro-lenses.

the plurality of optical elements is positioned in a network, such as for instance a grid, a honeycomb, or concentric rings.

the modulation transfer function of the lens element, for example for foveal vision, is measured through a surface of the lens element wherein the optical microstructure covers more or equal than 20%, preferably more or equal than 40%, of said surface.

According to some embodiments, the modulation transfer function of the lens element, for example for peripheral vision, is lower or equal to 0.8, preferably lower or equal to 0.7, over the range of spatial frequencies comprised from 3 to 7 cycles per degree, when measured through the optical microstructure for a pupil aperture of 4 mm centered at 6.6 mm from the optical center of the lens element.

Advantageously, as detailed below, lower values of modulation transfer function, for example for peripheral vision, in low frequencies (from 3 to 7 cycles per degree) ensures efficient slowing down of the abnormal refraction progression.

According to other embodiments, the proposed lens element may also comprise at least one of the following additional features:

the modulation transfer function, for example for peripheral vision, is lower or equal to 0.8, preferably lower or equal to 0.7, at a spatial frequency of 3 cycles per degree, when measured through the optical microstructure for a pupil aperture of 4 mm centered at 6.6 mm from the optical center of the lens element.

the modulation transfer function, for example for peripheral vision, is lower or equal to 0.7, preferably lower or equal to 0.55, at a spatial frequency of 4 cycles per degree, when measured through the optical microstructure for a pupil aperture of 4 mm centered at 6.6 mm from the optical center of the lens element.

the modulation transfer function, for example for peripheral vision, is lower or equal to 0.4, preferably lower or equal to 0.3, at a spatial frequency of 7 cycles per degree, when measured through the optical microstructure for a pupil aperture of 4 mm centered at 6.6 mm from the optical center of the lens element.

the modulation transfer function, for example for peripheral vision, is greater or equal to 0.15 over the range of spatial frequency comprised from 10 to 20 cycles per degree, when measured through the optical microstructure for a pupil aperture of 4 mm centered at 6.6 mm from the optical center of the lens element.

the modulation transfer function, for example for peripheral vision, is greater or equal to 0.3 at a spatial frequency of 10 cycles per degree, when measured through the optical microstructure for a pupil aperture of 4 mm centered at 6.6 mm from the optical center of the lens element.

the modulation transfer function, for example for peripheral vision, is greater or equal to 0.15 at a spatial frequency of 20 cycles per degree, when measured through the optical microstructure for a pupil aperture of 4 mm centered at 6.6 mm from the optical center of the lens element.

the modulation transfer function, for example for peripheral vision, is a horizontal modulation transfer function or a vertical modulation transfer function, preferably a horizontal modulation transfer function.

According to some embodiments, the modulation transfer function of the lens element, for example for peripheral vision, is lower or equal to 0.8, preferably lower or equal to 0.7, over the range of spatial frequencies comprised from 3 to 7 cycles per degree, when measured for a gaze direction of 0°, for a ray direction of 15° and a pupil aperture of 4 mm.

Advantageously, as detailed below, lower values of modulation transfer function, for example for peripheral vision, in low frequencies (from 3 to 7 cycles per degree) ensures efficient slowing down of the abnormal refraction progression.

According to other embodiments, the proposed lens element may also comprise at least one of the following additional features:

the modulation transfer function, for example for peripheral vision, is lower or equal to 0.8, preferably lower or equal to 0.7, at a spatial frequency of 3 cycles per degree, when measured for a gaze direction of 0°, for a ray direction of 15° and for a pupil aperture of 4 mm.

the modulation transfer function, for example for peripheral vision, is lower or equal to 0.7, preferably lower or equal to 0.55, at a spatial frequency of 4 cycles per degree, when measured for a gaze direction of 0°, for a ray direction of 15° and for a pupil aperture of 4 mm.

the modulation transfer function, for example for peripheral vision, is lower or equal to 0.4, preferably lower or equal to 0.3, at a spatial frequency of 7 cycles per degree, when measured for a gaze direction of 0°, for a ray direction of 15° and for a pupil aperture of 4 mm.

the modulation transfer function, for example for peripheral vision, is greater or equal to 0.15 over the range of spatial frequency comprised from 10 to 20 cycles per degree, when measured for a gaze direction of 0°, for a ray direction of 15° and for a pupil aperture of 4 mm.

the modulation transfer function, for example for peripheral vision, is greater or equal to 0.3 at a spatial frequency of 10 cycles per degree, when measured for a gaze direction of 0°, for a ray direction of 15° and for a pupil aperture of 4 mm.

the modulation transfer function, for example for peripheral vision, is greater or equal to 0.15 at a spatial frequency of 20 cycles per degree, when measured for a gaze direction of 0°, for a ray direction of 15° and for a pupil aperture of 4 mm.

the modulation transfer function, for example for peripheral vision, is a horizontal modulation transfer function or a vertical modulation transfer function, preferably a horizontal modulation transfer function.

According to a second aspect of the present invention, there also is provided a computer-implemented method for determining a lens element intended to be worn by a wearer, to provide a refractive power based on a prescription of the wearer for correcting an abnormal refraction of the eye of the wearer and to slow down the progression of an abnormal refraction of said eye of the wearer, wherein the lens element comprises an optical microstructure having an optical function of not focusing an image on the retina of the eye of the wearer so as to slow down the progression of the abnormal refraction of the eye of the wearer; wherein the method comprises the following steps:

providing a prescription of the wearer, and determining the optical microstructure so that the modulation transfer function, for example for foveal vision, is greater or equal to 0.07, preferably greater or equal to 0.10 over the range of spatial frequencies comprised from 10 to 25 cycles per degree, when measured through the optical microstructure for a pupil aperture of 4 mm centered at 6.6 mm from the optical center of the lens element.

According to a third aspect of the invention there is provided a computer program product comprising instructions for implementing a method according to the second aspect of the invention when the program is executed by a computer.

The is also provided a non-transitory storage medium readable by a computer storing instructions for implementing a method according to the second aspect of the invention, when executed by the computer.

BRIEF DESCRIPTION OF THE DRAWINGS

The invention will be more clearly understood from the following description, given by way of example only, with reference to the accompanying drawings, in which.

DETAILED DESCRIPTION OF THE INVENTION

The inventors identified that children wearing a lens element comprising a peripheral optical microstructure frequently look through the optical microstructure during reading activities. An object of the present invention is thus to preserve the visual performance in reading activities.

When reading, the visual system acquires a range of different spatial frequencies from text and these spatial frequencies then provide the basis for subsequent linguistic analyses that allow readers to make sense of what they are seeing. Studies on the relation between spatial frequency content and reading fluency showed that both low (i.e. 3 cycles per degree and below) and middle-high spatial frequencies (i.e. from 10 to 15 cycles per degree and above) are used to ensure accurate performances. The low spatial frequencies allow readers to see the lines' and words' overall shapes and to identify the global structure to organize eye movements and saccades. Low spatial frequencies cannot provide information about the fine details. The middle-high spatial frequencies allow readers to see words' fine details, such as the precise form and location of individual letters, which are used to access to words and sentences meaning.

Numerous authors studied the optimal spatial content for identifying letters and words. In these studies, the spatial content of the stimuli is usually expressed in terms of "cycles per letter" instead of "cycles per degree". According to the literature, words reading and letters identification is optimal and well preserved if their spatial contents do not drop below 2 cycles per letter—see Ginsburg (Specifying relevant spatial information for image evaluation and display design: an explanation of how we see certain objects. Proceedings of the Society of Information Display, 1980, 21, 219-227), Parish and Sperling (Object spatial frequencies, retinal spatial frequencies, noise and the efficiency of letter discrimination. Vision Research, 1991, 31, 1399-1415), Legge and colleagues (Psychophysics of reading: I. Normal vision. Vision Research, 1985, 25, 239-252), Solomon and Pelli (The visual filter mediating letter identification. Nature, 1994, 369, 395-397).

Translating these cycles per letter into spatial frequencies (i.e. related to viewing distance), the inventors estimate that text reading in near vision, with 12 pts letters font size, involves spatial frequency processing in the range from 10 to 15 cycles per degrees. The lowest frequencies involved in words and lines spatial discrimination are in the range from 0.5 to 3 cycles per degrees.

Figure 1:
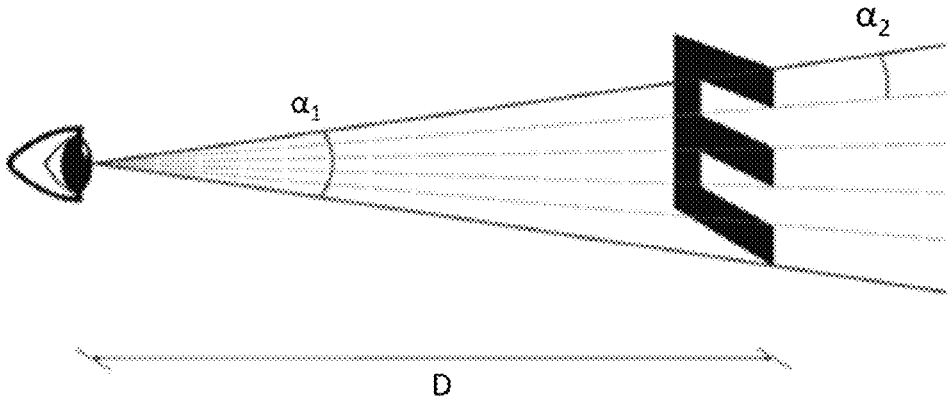
FIG. 1 illustrates how an eye with a 20/20 vision has the acuity to identify a letter that subtends an angle of 5 minutes of arc. Each bar of the E as well as the spaces between the bars subtends and angle of 1 minute of arc.

In addition, when children have to look at the board and identify letters and numbers in far vision, visual acuity has to be closer to the maximum, i.e. close to 20/20. A visual acuity of 20/20 is obtained when the observer can identify letters seen under a visual angle $\alpha_1$ of 5' with each element of the letter depicting an angle $\alpha_2$ of 1' at a distance D of 6 meters (see FIG. 1). Considering that 2 cycles per letters are enough for efficient letter identification, optotypes of 20/20 of visual acuity represent stimuli in a range from 20 to 25 cycles per degree.

Consequently, the inventors determined that the visual performance of children wearing the lens element with a peripheral optical microstructure will be preserved if the optical quality is preserved in the spatial frequencies involved in reading activities, i.e. in the ranges from 0.5 to 3 cycles per degree, from 10 to 15 cycles per degree and from 20 to 25 cycles per degree.

To quantify the optical quality of the lens element in the spatial frequencies' ranges determined above, the inventors measured the modulation transfer function, for example for foveal vision, of two lens elements configured to slow down myopia progression. As it is well known to the skilled artisan, the modulation transfer function is notably used to quantify the optical quality of the lens elements.

The modulation transfer function may be determined by:
  measuring the 3D surface of the lens element,
  determining a 2D representation of optical path differences of a light beam arriving normal to the lens element,
  determining the point spread function over a pupil aperture of 4 mm centered at 6.6 mm from the optical center of the lens element, and
  determining the modulation transfer function over said pupil by a Fourier transform operation.

Figure 2:
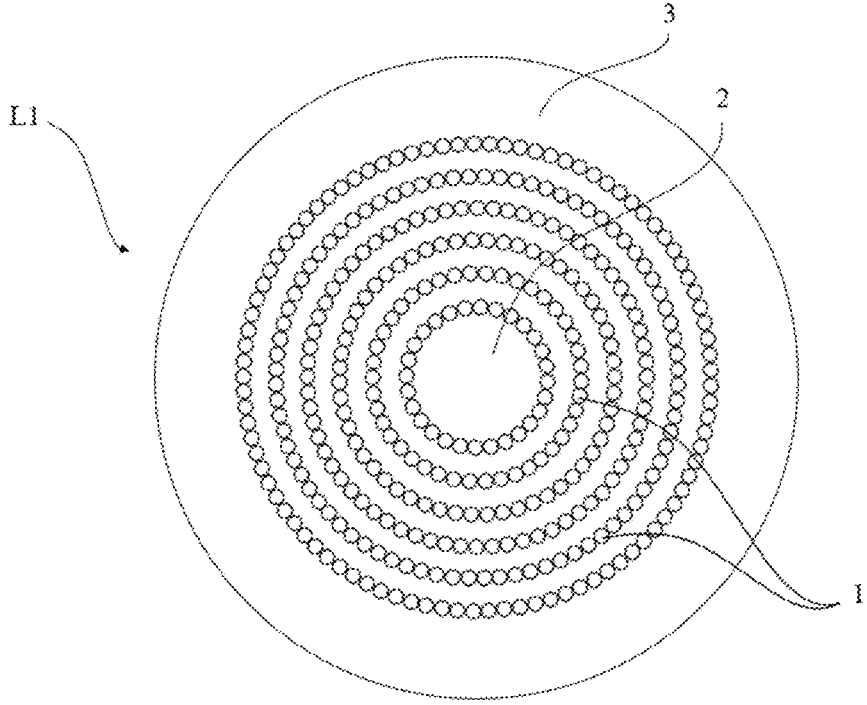
FIG. 2 illustrates a plan view of a lens element L1.

A first lens element (referred to as L1) is depicted in FIG. 2. L1 comprises an optical microstructure 1 having a concentric ring configuration with aspherical micro-lenses. The geometry of the aspheric micro-lenses (1.12 mm in diameter) has been calculated so as to generate a volume of non-focus light ranging from 1.1 to 1.9 mm in front of the retina at any eccentricity, serving as myopia control. L1 further comprises a refraction area comprising a clear central area 2 and a peripheral area 3.

Figure 3:
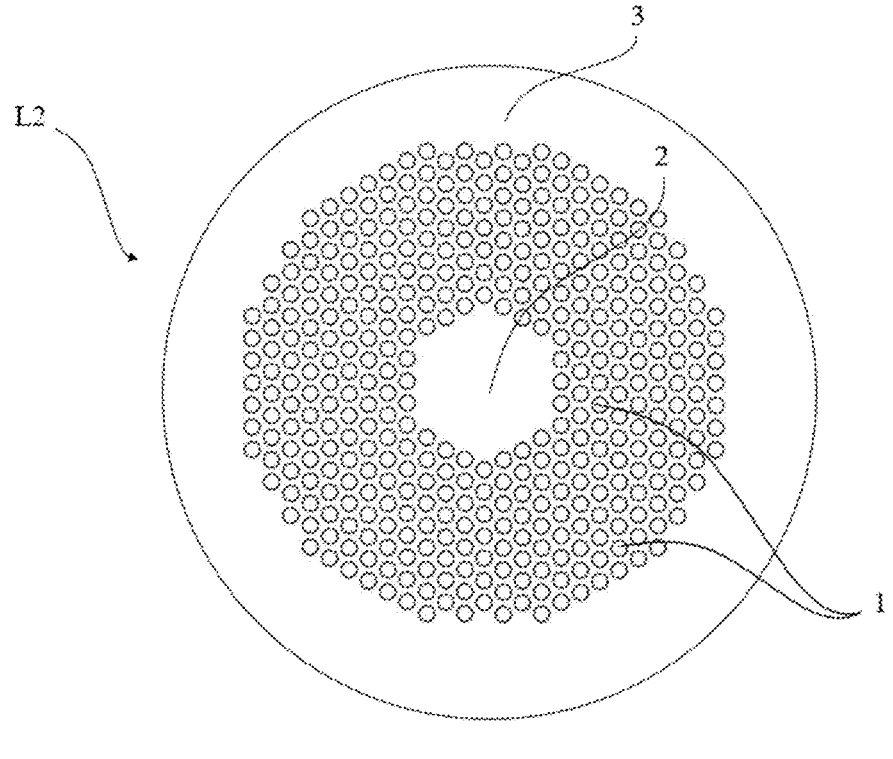
FIG. 3 illustrates a plan view of a lens element L2.

A second lens element (referred to as L2) is depicted in FIG. 3. L2 comprises an optical microstructure 1 having an honeycomb configuration of spherical micro-lenses. The micro-lenses (1.03 mm in diameter) introduce myopic defocus at a plane in front of the retina by a relative positive power (+3.50 D).

For both L1 and L2, the surface without micro-lenses provides distance correction and the two configurations of micro-lenses provided a similar density of micro-lenses that is about 40% of the total surface area of the lens element.

Figure 4:
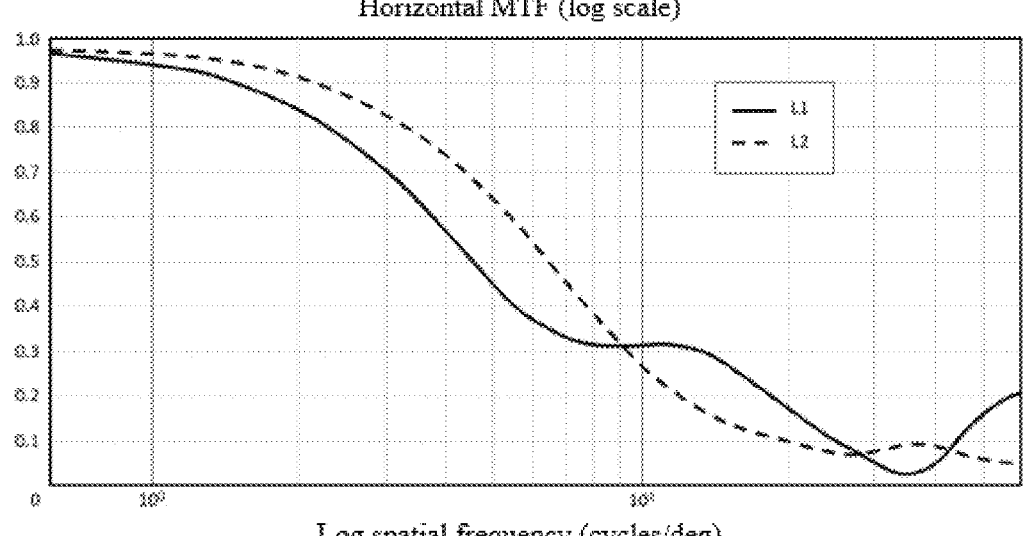
FIG. 4 represents the horizontal modulation transfer function, for example for foveal vision, of lens elements for a 4 mm pupil and 15° downwards gaze.

The inventors carried out measurements of the modulation transfer function for both L1 and L2. The horizontal modulation transfer functions, for example for foveal vision, are represented in FIG. 4.

Figures 5, 6:
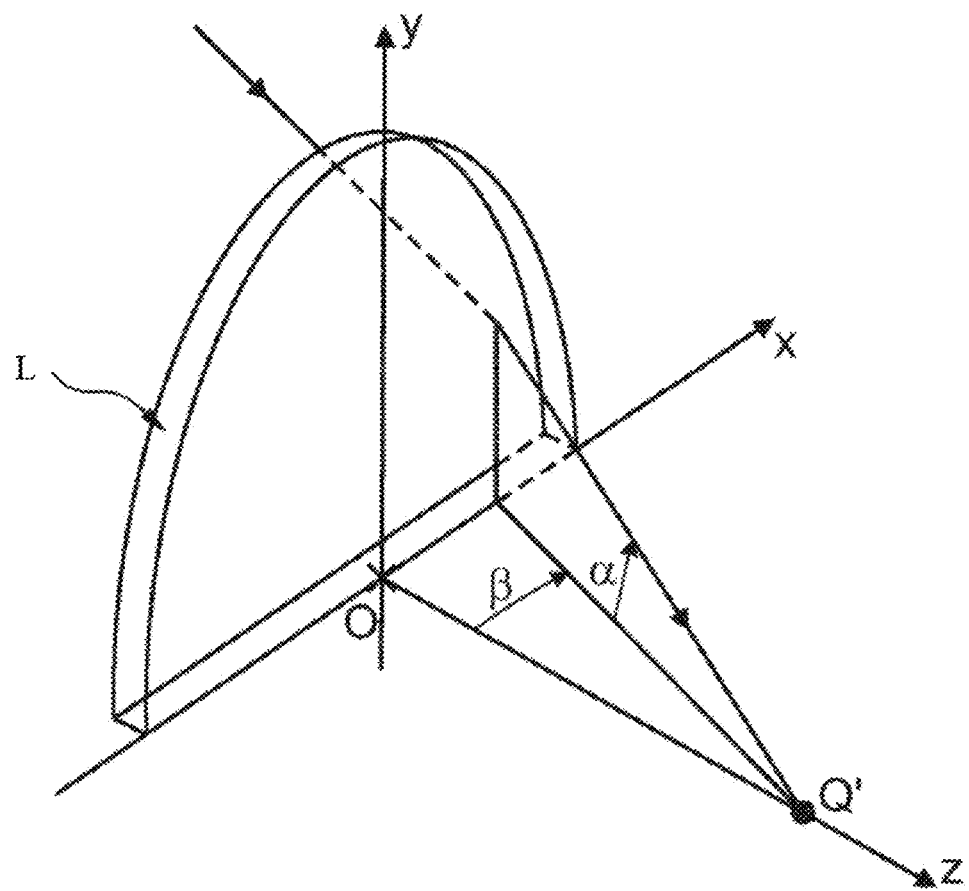
FIG. 5 illustrates VSOTF results for several lens elements when the gaze is 15° downwards.
FIGS. 6 and 7 illustrates diagrammatically optical systems of an eye and a lens element.

The inventors also carried out measurement of the visual Strehl ratio based on the optical transfer function (known as VSOTF). VSOTF is known to the skilled artisan as a good image quality measurement tool (Marsack, Thibos, Applegate, Metrics of optical quality derived from wave aberrations predict visual performance, Journal of Vision, 2004, 4, 8). VSOTF calculation is known to one skilled in the art—VSOTF is the ratio of the integral of the optical transfer function, weighted by the neural contrast sensitivity function, to that same integral for a diffraction limited system (Young, Love, Smithson, Accounting for the phase, spatial frequency and orientation demands of the task improves metrics based on the visual Strehl ratio, Vision Research, 2013, 90, 57-67). FIG. 5 shows the VSOTF results for L1, L2 and the single vision lens. As it is apparent from the results, L1 exhibits much higher VSOTF than L2. Therefore, the inventors considered that the values of the modulation transfer function of L2 could be considered as a lower limit in the spatial frequencies' ranges of interest.

In view of the above, the inventors determined the following lower limits of values for the modulation transfer function, for example for foveal vision, when measured through the optical microstructure for a pupil aperture of 4 mm centered at 6.6 mm from the optical center of the lens element:

0.07 over the range of spatial frequencies comprised from 10 to 25 cycles per degree, and/or
  0.15 over the range of spatial frequencies comprised from 10 to 15 cycles per degree, and/or
  0.07 over the range of spatial frequencies comprised from 20 to 25 cycles per degree, and/or
  0.70 over the range of spatial frequencies comprised from 0.5 to 3 cycles per degree.

According to a first aspect, the invention relates to a lens element intended to be worn by a wearer and to provide a refractive power based on a prescription of the wearer for correcting an abnormal refraction of the eye of the wearer.

According to some embodiments, the lens element is a spectacle lens element intended to be worn in front of an eye of a wearer. In the sense of the disclosure, a spectacle lens may be an un edged spectacle lens or a spectacle lens edged to fit in a spectacle frame. According to some embodiments, the lens element is a contact lens element intended to be worn on an eye of a wearer.

The lens element comprises an optical microstructure having an optical function of not focusing an image on the retina of the eye of the wearer so as to slow down progression of the abnormal refraction, for example myopia, of the eye of the wearer. In the sense of the invention "focusing" is to be understood as producing a focusing spot with a circular section that can be reduced to a point in the focal plane, for example in standard wearing conditions with no accommodation of the eye of the wearer and for an object point at a distance greater than or equal to 1.5 m for example greater than or equal to 4 m.

Advantageously, such optical function of the optical element reduces the deformation of the retina of the eye of the wearer in peripheral vision, allowing to slow down the progression of the abnormal refraction of the eye of the person wearing the lens element.

According to some embodiments, the lens element comprises an optical microstructure having an optical function of focusing an image other than on the retina of the eye of the wearer, for example in standard wearing conditions with no accommodation of the eye of the wearer and for an object point at a distance greater than or equal to 1.5 m for example greater than or equal to 4 m, so as to slow down progression of the abnormal refraction, for example myopia, of the eye of the wearer.

The modulation transfer function of the lens element, for example for foveal vision, is greater or equal to 0.07 over the range of spatial frequencies comprised from 10 to 25 cycles per degree, when measured through the optical microstructure for a pupil aperture of 4 mm centered at 6.6 mm from the optical center of the lens element. It means that the modulation transfer function is greater or equal to 0.07 over the whole range from 10 to 25 cycles per degree. As illustrated in FIG. 4, the modulation transfer function of the lens element L2 does not drop below 0.07 over the range of spatial frequencies comprised from 10 to 25 cycles per degree. The inventors have measured that the lower value of horizontal modulation transfer function for L2 over the range of spatial frequencies comprised from 10 to 25 cycles per degree is 0.07. According to some embodiments, the modulation transfer function of the lens element, for example for foveal vision, is greater or equal to 0.10, 0.15, 0.20, 0.25, 0.30, 0.35, 0.40, 0.45, 0.50, 0.55 or 0.60 over the range of spatial frequencies comprised from 10 to 25 cycles per degree, when measured through the optical microstructure for a pupil aperture of 4 mm centered at 6.6 mm from the optical center of the lens element. As illustrated in FIG. 4, the modulation transfer function of the lens element L1 does not drop below 0.10 over the range of spatial frequencies comprised from 10 to 25 cycles per degree. The inventors have measured that the lower value of horizontal modulation transfer function for L1 over the range of spatial frequencies comprised from 10 to 25 cycles per degree is 10. According to some embodiments, the mean modulation transfer function of the lens element, for example for foveal vision, over the range of spatial frequencies comprised from 10 to 25 cycles per degree is greater or equal to 0.20, preferably 0.22, when measured through the optical microstructure for a pupil aperture of 4 mm centered at 6.6 mm from the optical center of the lens element. According to some embodiments, the modulation transfer function of the lens element, for example for foveal vision, over the range of spatial frequencies comprised from 10 to 25 cycles per degree is lower or equal than 0.70, when measured through the optical microstructure for a pupil aperture of 4 mm centered at 6.6 mm from the optical center of the lens element.

According to some embodiments, the modulation transfer function of the lens element, for example for foveal vision, is greater or equal to 0.15 over the range of spatial frequencies comprised from 10 to 15 cycles per degree, when measured through the optical microstructure for a pupil aperture of 4 mm centered at 6.6 mm from the optical center of the lens element. As illustrated in FIG. 4, the modulation transfer function of the lens element L2 does not drop below 0.15 over the range of spatial frequencies comprised from 10 to 15 cycles per degree. The inventors have measured that the lower value of horizontal modulation transfer function for L2 over the range of spatial frequencies comprised from 10 to 15 cycles per degree is 0.15. According to some embodiments, the modulation transfer function of the lens element, for example for foveal vision, is greater or equal to 0.20, 0.25, 0.30, 0.35, 0.40, 0.45, 0.50, 0.55, 0.60 or 0.65 over the range of spatial frequencies comprised from 10 to 15 cycles per degree, when measured through the optical microstructure for a pupil aperture of 4 mm centered at 6.6 mm from the optical center of the lens element. As illustrated in FIG. 4, the modulation transfer function of the lens element L1 does not drop below 0.25 over the range of spatial frequencies comprised from 10 to 15 cycles per degree. The inventors have measured that the lower value of horizontal modulation transfer function for L1 over the range of spatial frequencies comprised from 10 to 15 cycles per degree is 0.28. According to some embodiments, the mean modulation transfer function of the lens element, for example for foveal vision, over the range of spatial frequencies comprised from 10 to 15 cycles per degree is greater or equal to 0.28, preferably 0.30, when measured through the optical microstructure for a pupil aperture of 4 mm centered at 6.6 mm from the optical center of the lens element. According to some embodiments, the modulation transfer function of the lens element, for example for foveal vision, over the range of spatial frequencies comprised from 10 to 15 cycles per degree is lower or equal than 0.90, when measured through the optical microstructure for a pupil aperture of 4 mm centered at 6.6 mm from the optical center of the lens element.

According to some embodiments, the modulation transfer function of the lens element, for example for foveal vision, is greater or equal to 0.07 over the range of spatial frequencies comprised from 20 to 25 cycles per degree, when measured through the optical microstructure for a pupil aperture of 4 mm centered at 6.6 mm from the optical center of the lens element. As illustrated in FIG. 4, the modulation transfer function of the lens element L2 does not drop below 0.07 over the range of spatial frequencies comprised from 20 to 25 cycles per degree. The inventors have measured that the lower value of horizontal modulation transfer function for L2 over the range of spatial frequencies comprised from 20 to 25 cycles per degree is 0.07. According to some embodiments, the modulation transfer function of the lens element, for example for foveal vision, is greater or equal to 0.10, 0.15, 0.20, 0.25, 0.30, 0.35, 0.40, 0.45, 0.50, 0.55 or 0.60 over the range of spatial frequencies comprised from 20 to 25 cycles per degree, when measured through the optical microstructure for a pupil aperture of 4 mm centered at 6.6 mm from the optical center of the lens element. As illustrated in FIG. 4, the modulation transfer function of the lens element L1 does not drop below 0.10 over the range of spatial frequencies comprised from 20 to 25 cycles per degree. The inventors have measured that the lower value of horizontal modulation transfer function for L1 over the range of spatial frequencies comprised from 20 to 25 cycles per degree is 0.10. According to some embodiments, the mean modulation transfer function of the lens element, for example for foveal vision, over the range of spatial frequencies comprised from 20 to 25 cycles per degree is greater or equal to 0.13, preferably 0.15, when measured through the optical microstructure for a pupil aperture of 4 mm centered at 6.6 mm from the optical center of the lens element. According to some embodiments, the modulation transfer function of the lens element, for example for foveal vision, over the range of spatial frequencies comprised from 20 to 25 cycles per degree is lower or equal than 0.72, when measured through the optical microstructure for a pupil aperture of 4 mm centered at 6.6 mm from the optical center of the lens element.

According to some embodiments, the modulation transfer function of the lens element, for example for foveal vision, is greater or equal to 0.70 over the range of spatial frequencies comprised from 0.5 to 3 cycles per degree, when measured through the optical microstructure for a pupil aperture of 4 mm centered at 6.6 mm from the optical center of the lens element. As illustrated in FIG. 4, the modulation transfer function of the lens elements L1 and L2 does not drop below 0.85 over the range of spatial frequencies comprised from 0.5 to 3 cycles per degree. The inventors have measured that the lower value of horizontal modulation transfer function for L2 over the range of spatial frequencies comprised from 0.5 to 3 cycles per degree is 0.85. The inventors have also measured that the lower value of horizontal modulation transfer function for L1 over the range of spatial frequencies comprised from 0.5 to 3 cycles per degree is 0.70. According to some embodiments, the modulation transfer function of the lens element, for example for foveal vision, is greater or equal to 0.75, 0.80, 0.85 or 0.90 over the range of spatial frequencies comprised from 0.5 to 3 cycles per degree, when measured through the optical microstructure for a pupil aperture of 4 mm centered at 6.6 mm from the optical center of the lens element. According to some embodiments, the mean modulation transfer function of the lens element, for example for foveal vision, over the range of spatial frequencies comprised from 0.5 to 3 cycles per degree is greater or equal to 0.82, preferably 0.85, when measured through the optical microstructure for a pupil aperture of 4 mm centered at 6.6 mm from the optical center of the lens element. According to some embodiments, the modulation transfer function of the lens element, for example for foveal vision, over the range of spatial frequencies comprised from 0.5 to 3 cycles per degree is lower or equal than 0.95, when measured through the optical microstructure for a pupil aperture of 4 mm centered at 6.6 mm from the optical center of the lens element.

According to some embodiments, the lens element is intended to provide a refractive power based on a prescription of the wearer for correcting an abnormal refraction of the eye of the wearer in standard wearing conditions. According to some embodiments, the lens element comprises an optical microstructure having an optical function of not focusing an image on the retina of the eye of the wearer in standard wearing conditions so as to slow down progression of the abnormal refraction of the eye of the wearer. According to some embodiments, the lens element comprises an optical microstructure having an optical function of focusing an image other than on the retina of the eye of the wearer in standard wearing conditions so as to slow down progression of the abnormal refraction of the eye of the wearer.

According to some embodiments, the lens element further comprises a refractive area configured to provide the refractive power based on the prescription of the wearer for correcting the abnormal refraction of the eye of the wearer in standard wearing conditions. According to some embodiments, the optical microstructure has an additional optical function of providing the refractive power based on the prescription of the wearer for correcting the abnormal refraction of the eye of the wearer in standard wearing conditions.

The standard wearing conditions are to be understood as the position of the lens element with relation to the eye of a wearer, for example defined by a pantoscopic angle, a Cornea to lens distance, a Pupil-cornea distance, an eye rotation center (ERC) to pupil distance, an ERC to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The ERC to pupil distance is the distance along the visual axis of the eye between its center of rotation (ERC) and pupil; for example equal to 11.5 mm.

The ERC to lens distance is the distance along the visual axis of the eye in the primary position (usually taken to be the horizontal) between the ECR of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to 8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position; for example equal to 0°.

An example of standard wearer conditions may be defined by Cornea to lens distance of 12 mm, a Pupil to cornea distance of 2 mm, an ERC to pupil distance of 11.5 mm, an ERC to lens distance of 25.5 mm, a pantoscopic angle of 8°, a and a wrap angle of 0°.

Figure 7:
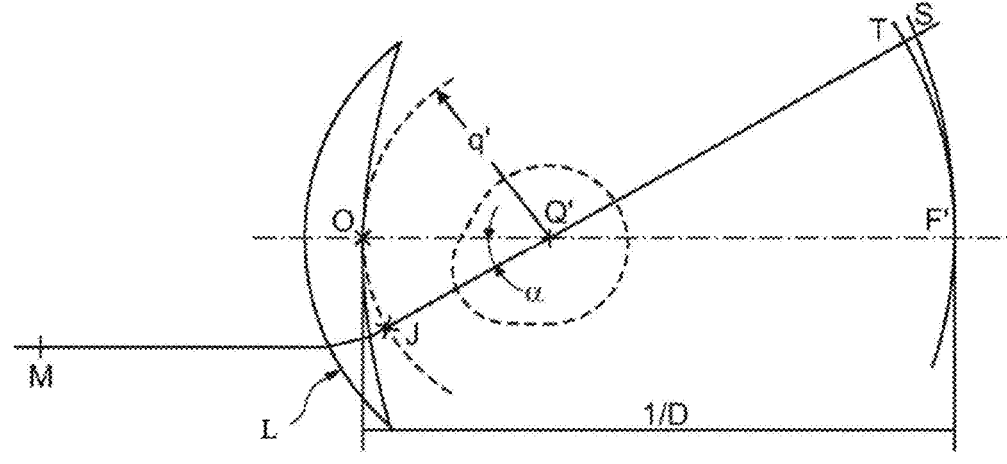

FIGS. 6 and 7 are diagrammatic illustrations of optical systems of an eye and a lens element, thus showing the definitions used in the description. More precisely, FIG. 6 represents a perspective view of such a system illustrating parameters $\alpha$ and $\beta$ used to define a gaze direction. FIG. 7 is a view in the vertical plane parallel to the anteroposterior axis of the wearer's head and passing through the eye rotation center in the case wherein the parameter $\beta$ equal to 0.

The eye rotation center is labelled Q'. The axis Q'F', shown on FIG. 7 in a dot-dash line, is the horizontal axis passing through the eye rotation center and extending in front of the wearer—that is the axis Q'F' corresponding to the primary gaze view. This axis cuts the surface of the lens element L on a point called the fitting cross, which is present on lenses to enable the positioning of lenses in a frame by an optician. The point of intersection of the rear surface of the lens and the axis Q'F' is the point O. O can be the fitting cross if it is located on the rear surface. A vertex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 7—corresponds to a position of the eye in rotation around Q' and to a point J of the vertex sphere. The angle $\beta$ is the angle formed between the axis Q'F' and the projection of the straight line Q'J on the horizontal plane comprising the axis Q'F'; this angle appears on the scheme on FIG. 6. The angle $\alpha$ is the angle formed between the axis Q'J and the projection of the straight line Q'J on the horizontal plane comprising the axis Q'F'; this angle appears on the scheme on FIGS. 6 and 7. A given gaze view thus corresponds to a point J of the vertex sphere or to a couple ($\alpha$, $\beta$). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle $\alpha$ of the order of 35° and to an angle $\beta$ of the order of 5° in absolute value toward the nasal side, the object distance is of the order of 25 to 50 cm. For more details concerning a possible definition of an ergorama, U.S. Pat. No. 6,318,859 may be considered. This document describes an ergorama, its definition and its modelling method. For a method of the invention, points may be at infinity or not. Ergorama may be a function of the wearer's ametropia or wearer's addition.

Using these elements, it is possible to define a wearer optical power and astigmatism, in each gaze direction. An object point M at an object distance given by the ergorama is considered for a gaze direction ($\alpha$, $\beta$). An object proximity ProxO is defined for the point M on the corresponding light ray in the object space as the inverse of the distance MJ between point M and point J of the vertex sphere:

$$ProxO=1/MJ$$

This enables to calculate the object proximity within a thin lens approximation for all points of the vertex sphere, which is used for the determination of the ergorama. For a real lens, the object proximity can be considered as the inverse of the distance between the object point and the front surface of the lens, on the corresponding light ray.

For the same gaze direction ($\alpha$, $\beta$), the image of a point M having a given object proximity is formed between two points S and T which correspond respectively to minimal and maximal focal distances (which would be sagittal and tangential focal distances). The quantity ProxI is called image proximity of the point M:

$$ProxI=\tfrac{1}{2}(1/JT+1/JS)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui=ProxO+ProxI$$

With the same notations, an astigmatism Ast is defined for every gaze direction and for a given object proximity as:

$$Ast=|1/JT-1/JS|$$

This definition corresponds to the astigmatism of a ray beam created by the lens element. It can be noticed that the definition gives, in the primary gaze direction, the classical value of astigmatism. The astigmatism angle, usually called axis, is the angle $\gamma$. The angle $\gamma$ is measured in the frame {Q', xm, ym, zm} linked to the eye. It corresponds to the angle with which the image S or T i formed depending on the convention used with relation to the direction zm in the plane {Q', zm, ym}.

Possible definitions of the optical power and the astigmatism of the lens, in the wearing conditions, can thus be calculated as explained in the article by B. Bourdoncle et al., titled Ray tracing through progressive ophthalmic lenses, 1990 International Lens Design Conference, D. T. Moore ed., Proc. Soc. Photo. Opt. Instrum. Eng.

The modulation transfer function has been widely used to quantify the optical quality of a lens element. The modulation transfer function can be determined by any method known to one skilled in the art. According to some embodiments, to calculate modulation transfer function, the complex amplitude in the pupil plane is evaluated, then using fast Fourier transform the point spread function is calculated and finally the modulation transfer function, for example for foveal vision, is calculated (G. Voelz. Computational fourier optics: a MATLAB tutorial. SPIE Press Bellingham, WA, 2011). According to some embodiments, the modulation transfer function was computed using one center wavelength ($\lambda$=550 nm). Modulation transfer function, for example for foveal vision, were computed for a pupil aperture of 4 mm, a gaze direction of 15° downwards ($\alpha$=−15°, $\beta$=0°), at various spatial frequencies.

In more details, for a gaze direction of 15° downwards ($\alpha$=−15°, $\beta$=0°), a ray is propagated to the object space from the eye rotation center (ERC). An object point ProxO is then calculated using the ergorama, which associates gaze directions to proximities. Assuming the target wearer power is Pui, then the image plane should be positioned at a proximity ProxIm=Pui−ProxO from the vertex sphere, calculated along the ERC-Pupil axis.

Once the object proximity ProxO and the Image proximity ProxI are defined, then the point spread function and the modulation transfer function can be computed as for any optical system. For instance:

a beam of rays is propagated from the object point to the eye entrance pupil, so as to perform a regular sampling of the pupil. The optical path lengths should be stored during this step.

the optical path lengths are used to compute the pupil function.

a diffraction integral is applied to the pupil function in order to obtain the point spread function.

the modulation transfer function is computed from the point spread function using a Fourier Transform.

According to some embodiments, the measured modulation transfer function, for example for foveal vision, is a horizontal modulation transfer function or a vertical modulation transfer function, preferably a horizontal modulation transfer function. The inventors identified that at least one of the horizontal modulation transfer function or the vertical modulation transfer function should be in the claimed range to enable proper identification of the letters and words during reading activities.

The term "horizontal" refers here to the horizontal with respect to the wearer according to the TABO convention. Likewise, the term "vertical" refers here to the vertical with respect to the wearer according to the TABO convention.

According to the invention, the modulation transfer function of the lens element, for example for foveal vision, is measured through the optical microstructure. "Through the optical microstructure" means that the modulation transfer function of the lens element, for example for foveal vision, is measured through a surface of the lens element wherein the optical microstructure covers more or equal than 20%, preferably more or equal than 40%, of said surface.

To ensure efficient suppression or reduction of the progression of the abnormal refraction of the eye, the inventors also measured the modulation transfer function, for example for peripheral vision, of two lens elements configured to slow down myopia progression: a first lens element L1 (as detailed above) and a third lens element L3.

L3 comprises an optical microstructure 1 having a concentric ring configuration with aspherical micro-lenses. The geometry of the aspheric micro-lenses (1.12 mm in diameter) has been calculated so as to generate a volume of non-focus light ranging from 1.0 to 1.3 mm in front of the retina at any eccentricity, serving as myopia control. L3 further comprises a refraction area comprising a clear central area and a peripheral area. For both L1 and L3, the surface without micro-lenses provides distance correction and the two configurations of micro-lenses provided a similar density of micro-lenses that is about 40% of the total surface area of lens element.

The inventors carried out measurements of the modulation transfer function for both L1 and L3. The modulation transfer function, for example for peripheral vision, is represented, in FIG. 8.

Figure 9:
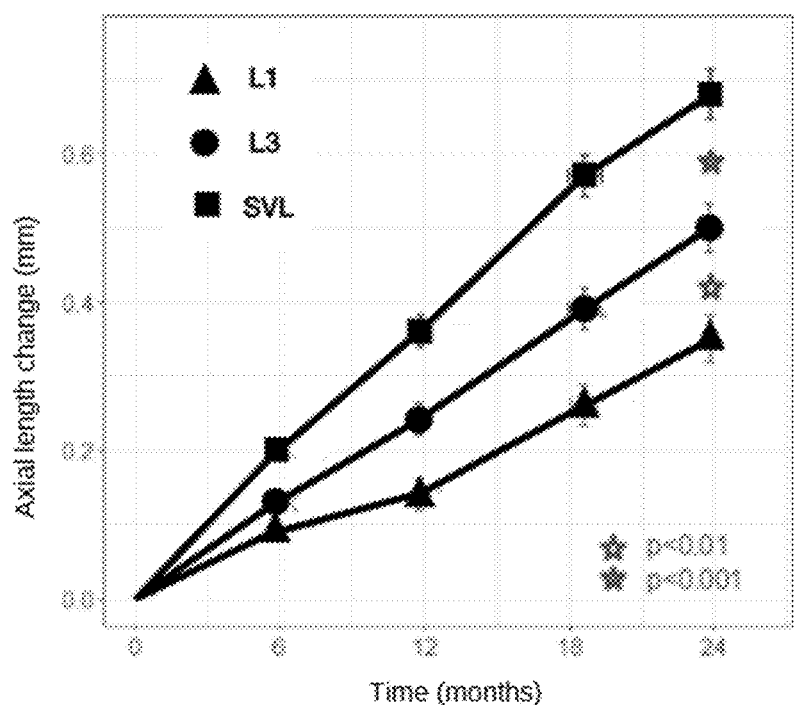
FIG. 9 illustrates the axial elongation over time for schoolchildren with L1 and L3 lens elements, in comparison with schoolchildren with single vision lens.

FIG. 9 shows the efficacy of L1 and L3 lens elements, in comparison with single vision lens, in slowing axial elongation over a period of 24 months. As it is apparent from the results, L1 exhibits higher myopia control efficacy than L3. Therefore, the inventors considered that the values of the modulation transfer function for peripheral of L3 could be considered as a limit.

According to some embodiments, the modulation transfer function of the lens element, for example for peripheral vision, is lower or equal to 0.8 over the range of spatial frequencies comprised from 3 to 7 cycles per degree, when measured through the optical microstructure for a gaze direction of 0°, for a ray direction of 15° and for a pupil aperture of 4 mm.

According to some embodiments, the modulation transfer function of the lens element, for example for peripheral vision, is lower or equal to 0.8 over the range of spatial frequencies comprised from 3 to 7 cycles per degree, when measured through the optical microstructure for a pupil aperture of 4 mm centered at 6.6 mm from the optical center of the lens element.

Figure 8:
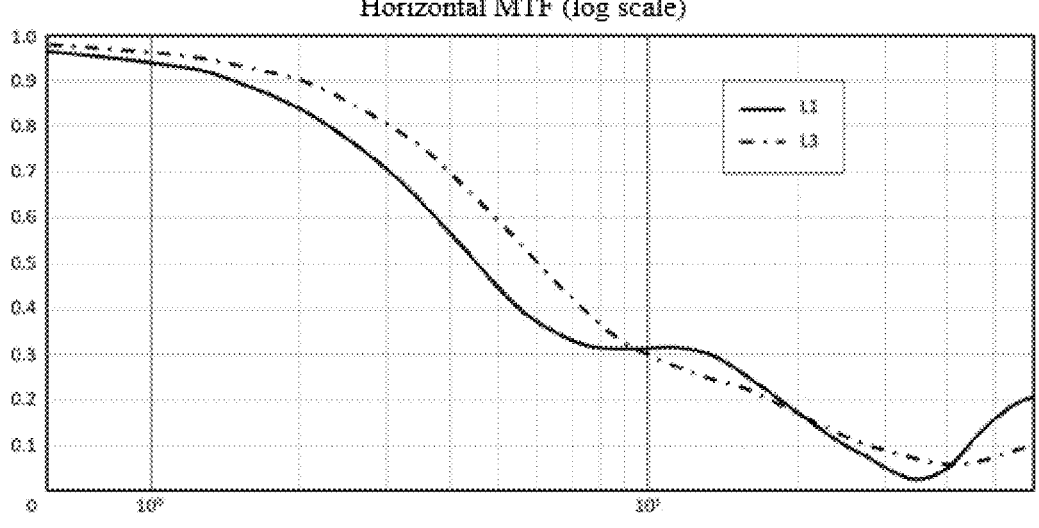
FIG. 8 represents the horizontal modulation transfer function, for example for peripheral vision, of lens elements for a gaze direction of 0°, for a ray direction of 15° and a pupil aperture of 4 mm.

As illustrated in FIG. 8, the modulation transfer function of the lens element L3 does not exceed 0.80 over the range of spatial frequencies comprised from 3 to 7 cycles per degree, when measured through the optical microstructure for a gaze direction of 0°, for a ray direction of 15° and for a pupil aperture of 4 mm. The inventors have measured that the higher value of horizontal modulation transfer function for L3 over the range of spatial frequencies comprised from 3 to 7 cycles per degree is 0.80. According to some embodiments, the modulation transfer function of the lens element, for example for peripheral vision, is lower or equal to 0.75, 0.7, 0.65, 0.6, 0.55, 0.5, 0.45, 0.4, 0.35 or 0.3 over the range of spatial frequencies comprised from 3 to 7 cycles per degree, when measured through the optical microstructure for a gaze direction of 0°, for a ray direction of 15° and for a pupil aperture of 4 mm. As illustrated in FIG. 8, the modulation transfer function of the lens element L1 does not exceed 0.7 over the range of spatial frequencies comprised from 3 to 7 cycles per degree, when measured through the optical microstructure for a gaze direction of 0°, for a ray direction of 15° and for a pupil aperture of 4 mm. The inventors have measured that the higher value of horizontal modulation transfer function for L1 over the range of spatial frequencies comprised from 3 to 7 cycles per degree is 0.70.

According to some embodiments, the mean modulation transfer function of the lens element, for example for peripheral vision, over the range of spatial frequencies comprised from 3 to 7 cycles per degree is lower or equal to 0.53, preferably 0.51, when measured through the optical microstructure for a gaze direction of 0°, for a ray direction of 15° and for a pupil aperture of 4 mm or when measured through the optical microstructure for a pupil aperture of 4 mm centered at 6.6 mm from the optical center of the lens element.

According to some embodiments, the modulation transfer function of the lens element, for example for peripheral vision, over the range of spatial frequencies comprised from 3 to 7 cycles per degree is higher or equal to 0.30, preferably 0.35 when measured through the optical microstructure for a gaze direction of 0°, for a ray direction of 15° and for a pupil aperture of 4 mm or when measured through the optical microstructure for a pupil aperture of 4 mm centered at 6.6 mm from the optical center of the lens element.

According to some embodiments, the modulation transfer function, for example for peripheral vision, is lower or equal to 0.8, 0.75, 0.7, 0.65, 0.6, 0.55, 0.5, 0.45, 0.4, 0.35 or 0.3 at a spatial frequency of 3 cycles per degree, when measured for a gaze direction of 0°, for a ray direction of 15° and for a pupil aperture of 4 mm or when measured through the optical microstructure for a pupil aperture of 4 mm centered at 6.6 mm from the optical center of the lens element.

According to some embodiments, the modulation transfer function, for example for peripheral vision, is lower or equal to 0.7, 0.65, 0.6, 0.55, 0.5, 0.45, 0.4, 0.35, 0.3, 0.25 or 0.2 at a spatial frequency of 4 cycles per degree, when measured for a gaze direction of 0°, for a ray direction of 15° and for a pupil aperture of 4 mm or when measured through the optical microstructure for a pupil aperture of 4 mm centered at 6.6 mm from the optical center of the lens element.

According to some embodiments, the modulation transfer function, for example for peripheral vision, is lower or equal to 0.4, 0.35, 0.3, 0.25 or 0.2 at a spatial frequency of 7 cycles per degree, when measured for a gaze direction of 0°, for a ray direction of 15° and for a pupil aperture of 4 mm or when measured through the optical microstructure for a pupil aperture of 4 mm centered at 6.6 mm from the optical center of the lens element.

According to some embodiments, the modulation transfer function, for example for peripheral vision, is greater or equal to 0.15 over the range of spatial frequencies comprised from 10 to 20 cycles per degree, when measured for a gaze direction of 0°, for a ray direction of 15° and a pupil aperture of 4 mm or when measured through the optical microstructure for a pupil aperture of 4 mm centered at 6.6 mm from the optical center of the lens element.

As illustrated in FIG. 8, the modulation transfer function of the lens element L3 does not drop below 0.17 over the range of spatial frequencies comprised from 10 to 20 cycles per degree, when measured for a gaze direction of 0°, for a ray direction of 15° and a pupil aperture of 4 mm or when measured through the optical microstructure for a pupil aperture of 4 mm centered at 6.6 mm from the optical center of the lens element. The inventors have measured that the lower value of horizontal modulation transfer function for L3 over the range of spatial frequencies comprised from 10 to 20 cycles per degree is 0.17. According to some embodiments, the modulation transfer function of the lens element, for example for peripheral vision, is greater or equal to 0.17, 0.20, 0.25, 0.30, 0.35, 0.40, 0.45, 0.50, 0.55, 0.60, 0.65 or 0.70 over the range of spatial frequencies comprised from 10 to 20 cycles per degree, when measured for a gaze direction of 0°, for a ray direction of 15° and a pupil aperture of 4 mm or when measured through the optical microstructure for a pupil aperture of 4 mm centered at 6.6 mm from the optical center of the lens element. The inventors have measured that the lower value of horizontal modulation transfer function for L1 over the range of spatial frequencies comprised from 10 to 20 cycles per degree is 0.17. According to some embodiments, the mean modulation transfer function of the lens element, for example for peripheral vision, over the range of spatial frequencies comprised from 10 to 20 cycles per degree is greater or equal to 0.23, preferably 0.25, when measured through the optical microstructure for a gaze direction of 0°, for a ray direction of 15° and for a pupil aperture of 4 mm or when measured through the optical microstructure for a pupil aperture of 4 mm centered at 6.6 mm from the optical center of the lens element. According to some embodiments, the modulation transfer function of the lens element, for example for peripheral vision, over the range of spatial frequencies comprised from 10 to 20 cycles per degree is lower or equal to 0.85, preferably 0.80 when measured through the optical microstructure for a gaze direction of 0°, for a ray direction of 15° and for a pupil aperture of 4 mm or when measured through the optical microstructure for a pupil aperture of 4 mm centered at 6.6 mm from the optical center of the lens element.

According to some embodiments, the modulation transfer function, for example for peripheral vision, is greater or equal to 0.3, 0.35, 0.40, 0.45 or 0.50 at a spatial frequency of 10 cycles per degree, when measured for a gaze direction of 0°, for a ray direction of 15° and for a pupil aperture of 4 mm or when measured through the optical microstructure for a pupil aperture of 4 mm centered at 6.6 mm from the optical center of the lens element.

According to some embodiments, the modulation transfer function, for example for peripheral vision, is greater or equal to 0.15, 0.20, 0.25, 0.30, 0.35 or 0.40 at a spatial frequency of 20 cycles per degree, when measured for a gaze direction of 0°, for a ray direction of 15° and for a pupil aperture of 4 mm or when measured through the optical microstructure for a pupil aperture of 4 mm centered at 6.6 mm from the optical center of the lens element.

According to some embodiment, the measured modulation transfer function, for example for peripheral vision, is a horizontal modulation transfer function or a vertical modulation transfer function, preferably a horizontal modulation transfer function.

According to an aspect of the disclosure, modulation transfer function, for example for peripheral vision, were computed for a pupil aperture of 4 mm, a gaze direction of 0° ($\alpha=0°$, $\beta=0°$) and a ray direction of 15° downwards ($\alpha'=15°$, $\beta'=0°$), at various spatial frequencies. Here the parameters $\alpha'$ and $\beta'$ corresponds to the angle defined in FIG. 6 but for a ray direction and not a gaze direction. In more details, for a gaze direction of 0° downwards ($\alpha=0°$, $\beta=0°$), a ray ($\alpha'=-15°$, $\beta=0°$) is propagated to the object space from the eye rotation center (ERC). An object point ProxO is then calculated using the ergorama, which associates gaze directions (replaced here by ray directions) to proximities. Assuming the target wearer power is Pui, then the image plane should be positioned at a proximity ProxIm=Pui−ProxO from the vertex sphere, calculated along the ERC-Pupil axis.

Once the object proximity ProxO and the Image proximity ProxI are defined, then the point spread function and the modulation transfer function can be computed as for any optical system. For instance:

a beam of rays is propagated from the object point to the eye entrance pupil, so as to perform a regular sampling of the pupil. The optical path lengths should be stored during this step.

the optical path lengths are used to compute the pupil function.

a diffraction integral is applied to the pupil function in order to obtain the point spread function.

the modulation transfer function is computed from the point spread function using a Fourier Transform.

According to the invention, the modulation transfer function of the lens element, for example for peripheral vision, is measured through the optical microstructure. "Through the optical microstructure" means that the modulation transfer function of the lens element, for example for peripheral vision, is measured through a surface of the lens element wherein the optical microstructure covers more or equal than 20%, preferably more or equal than 40%, of said surface.

As represented, for instance on FIG. 2 or 3, a lens element comprises an optical microstructure 1 having an optical function of not focusing an image on the retina of the eye of the wearer in standard wearing conditions so as to slow down progression of the abnormal refraction of the eye of the wearer.

According to some embodiments, the optical microstructure 1 has an additional optical function of providing the refractive power based on the prescription of the wearer for correcting the abnormal refraction of the eye of the wearer.

According to some embodiment, the lens element further comprises a refractive area configured to provide the refractive power based on the prescription of the wearer for correcting the abnormal refraction of the eye of the wearer. As depicted on FIG. 2 or 3, the refractive area comprises a central area 2 and a peripheral area 3. The refractive area is preferably formed as the area other than optical microstructure. In other words, the refractive area is the complementary area to the area formed by the optical microstructure. According to some embodiments, the central area of the lens element does not comprise any part of the optical microstructure. For example, the lens element may comprise an empty zone centred on the optical center of said lens element and having a diameter equal to 9 mm which does not comprise any part of the optical microstructure. The optical center of the lens element may correspond to the fitting point of the lens. Alternatively, the optical microstructure may be disposed on the entire surface of the lens element. According to some embodiments, the refractive area is further configured to provide to the wearer, in particular, for example for foveal vision, a second optical power different from the first optical power based on the prescription of the wearer. In the sense of the invention, the two optical powers are considered different when the difference between the two optical powers is greater than or equal to 0.5 diopter.

The term "prescription" is to be understood to mean a set of optical characteristics of optical power, of astigmatism, of prismatic deviation, determined by an ophthalmologist or optometrist in order to correct the vision defects of the eye, for example by means of a spectacle lens positioned in front of the eye or by means of a contact lens positioned on the eye. For example, the prescription for a myopic eye comprises the values of optical power and of astigmatism with an axis for the distance vision.

Figure 10:
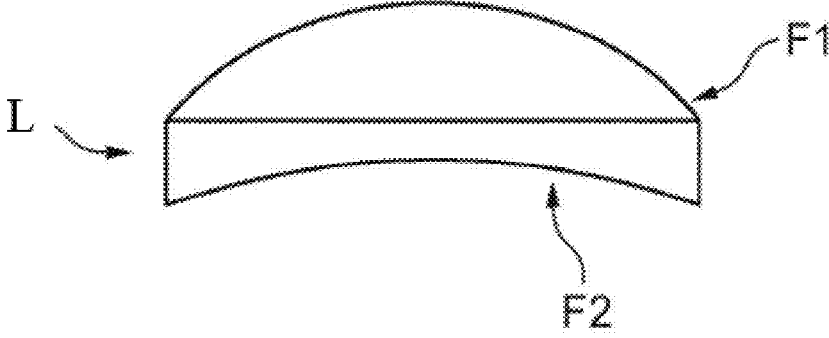
FIG. 10 illustrates a general cross-section view of a lens element.

As illustrated on FIG. 10, a lens element L according to the invention comprises an object-side surface F1 formed as a convex curved surface toward an eye-side surface F2 formed as a concave surface having a different curvature than the curvature of the object side surface F1.

According to some embodiments, the lens element comprises a coating on the object-side surface and/or the eye-side surface. According to said embodiments, the modulation transfer function is measured with or without the coating.

According to some embodiments, the optical microstructure is disposed on the object-side surface and/or the eye-side surface and/or between the object-side surface and the eye-side surface of the lens element.

According to some embodiments, the optical microstructure modifies the intensity and/or curvature of the wavefront and/or deviates light.

According to some embodiments, the optical microstructure is absorptive and absorbs wavefront intensity in a range from 0% to 100%, preferably in a range from 20% to 80%, more preferably in a range from 30% to 70%. For example, the optical microstructure has a transmittance at 500 nm is greater than or equal to 50%, for example greater than 75%, for example greater than 85%. According to some embodiments, the optical microstructure absorbs locally, i.e. at the intersection between the optical microstructure and the wavefront.

According to some embodiments, the optical microstructure modifies the wavefront curvature in a range from −20 diopters to +20 diopters, preferably in a range from −10 diopters to +10 diopters, more preferably in a range from −5.5 diopters to 5.5 diopters. According to some embodiments, the optical microstructure modifies the wavefront curvature locally, i.e. at the intersection between the optical microstructure and the wavefront.

According to some embodiments, the optical microstructure scatters light. The light may be scattered with an angle ranging from +/−1° to +/−30°. According to some embodiments, the optical microstructure scatters light locally, i.e. at the intersection between the optical microstructure and the wavefront.

According to some embodiments, the ratio between the area of the optical microstructure and the area of said lens element is comprised between 20% and 70%, preferably between 30% and 60%, and more preferably between 40% and 50%.

According to some embodiments, the optical microstructure comprises a plurality of optical elements, such as for instance micro-lenses.

According to some embodiments, at least one, at least 50%, at least 80% and preferably all the optical elements has an optical function of not focusing an image on the retina of the eye of the wearer. According to some embodiments, at least one, at least 50%, at least 80% and preferably all the optical elements has an optical function of not focusing an image on the retina of the eye of the wearer in standard wearing conditions. According to some embodiments, at least one, at least 50%, at least 80%, more preferably all, of the optical elements have an optical function of focusing an image, for example for peripheral vision, on a position other than the retina. According to some embodiments, at least one, at least 50%, at least 80%, more preferably all, of the optical elements have an optical function of focusing an image, for example for peripheral vision, on a position other than the retina in standard wearing conditions.

According to a preferred embodiment of the invention, all of the optical elements are configured so that the mean focus of the light rays passing through each optical element is at a same distance to the retina of the wearer, at least, for example for peripheral vision. The optical function, in particular the dioptric function, of each optical element may be optimized so as to provide a focus image, in particular in peripheral vision, at a constant distance of the retina of the eye of the wearer. Such optimization requires adapting the dioptric function of each of the optical element depending on their position on the lens element. The optical element density or the quantity of power may be adjusted depending on zones of the lens element. Typically, the optical element may be positioned in the periphery of the lens element, in order to increase the effect of the optical element on myopia control, so as to compensate peripheral defocus due to the peripheral shape of the retina.

According to a preferred embodiment of the invention, the optical elements are independent. In the sense of the invention, two optical elements are considered as independent if producing independent images. In particular, when illuminated by a parallel beam "in central vision", each "independent contiguous optical element" forms on a plane in the image space a spot associated with it.

According to some embodiments, the optical elements have a height ranging from 0.1 μm to 50 μm. According to some embodiments, the optical elements have a length ranging from 0.5 μm to 1.5 mm. According to some embodiments, the optical elements have width ranging from 0.5 μm to 1.5 mm. According to some embodiments, the optical elements have a diameter ranging from 0.8 mm to 3.0 mm, preferably from 1 mm to 2.0 mm, more preferably from 1 mm to 1.2 mm. According to some embodiments, the optical elements have a contour shape being inscribable in a circle having a diameter greater than or equal to 0.8 mm and smaller than or equal to 3.0 mm, preferably greater than or equal to 1.0 mm and smaller than 2.0 mm. According to some embodiments, the optical elements introduce myopic defocus at a plane in front of the retina by a relative positive power ranging from 2 to 7 diopters, preferably ranging from 3.5 to 5.5 diopters.

According to some embodiments, the ratio between the sum of areas of the optical elements and the area of lens element is comprised between 20% and 70%, preferably between 30% and 60%, and more preferably between 40% and 50%.

According to some embodiments, the plurality of optical elements is positioned in a network. The network may be a random network or a structured network, such as for instance a grid, a honeycomb, or concentric rings. According to some embodiments, the structured network is a squared network, a hexagonal network, a triangle network or an octagonal network.

According to some embodiments, the plurality of optical elements is positioned in a grid with a constant grid step.

According to some embodiments, at least part of the optical elements is contiguous. In the sense of the present invention, two optical elements located on a surface of the lens element are contiguous if there is a path supported by said surface that links the two optical elements and if along said path one does not reach the basis surface on which the optical elements are located. When the surface on which the at least two optical elements are located is spherical, the basis surface corresponds to said spherical surface. In other words, two optical elements located on a spherical surface are contiguous if there is a path supported by said spherical surface and linking them and if along said path one may not reach the spherical surface.

When the surface on which the at least two optical elements are located is non-spherical, the basis surface corresponds to the local spherical surface that best fit said non-spherical surface. In other words, two optical elements located on a non-spherical surface are contiguous if there is a path supported by said non-spherical surface and linking them and if along said path one may not reach the spherical surface that best fit the non-spherical surface. Advantageously, having contiguous optical elements helps improving the aesthetic of the lens element and is easier to manufacture.

According to some embodiments, the contiguous optical elements are independent.

According to some embodiment, the distance between optical elements ranges from 0 (contiguous optical elements) and 3 times the length and/or width of the optical elements.

According to some embodiments, at least one, for example all, of the optical elements has a non-spherical optical function. According to some embodiments, at least one, for example all, of the optical elements has an aspherical optical function.

According to some embodiments, at least one, for example all, of the optical elements has a spherical optical function.

According to some embodiments, at least one of the optical elements, preferably more than 50%, more preferably more than 80% of the optical elements are aspherical micro-lenses. In the sense of the invention, aspherical micro-lenses have a continuous power evolution over their surface. An aspherical micro-lens may have an asphericity comprised between 0.1 diopter and 3 diopters. The asphericity of an aspherical micro-lens corresponds to the difference of optical power measured in the center of the micro-lens and the optical power measured in the periphery of the micro lens.

The center of the micro-lens may be defined by a spherical area centered on the geometrical center of the micro lens and having a diameter comprised between 0.1 mm and 0.5 mm, preferably equal to 2.0 mm. The periphery of the micro-lens may be defined by an annular zone centered on the geometrical center of the micro-lens and having an inner diameter comprised between 0.5 mm and 0.7 mm and an outer diameter comprised between 0.70 mm and 0.80 mm.

According to some embodiments, the aspherical micro-lenses have an optical power in their geometrical center comprised between 2.0 diopters and 7 diopters in absolute value, and an optical power in their periphery comprised between 1.5 diopters and 6.0 diopters in absolute value.

The asphericity of the aspherical micro lenses before the coating of the surface of the lens element on which the optical elements are disposed may vary according to the radial distance from the optical center of said lens element.

Additionally, the asphericity of the aspherical micro-lenses after the coating of the surface of the lens element on which the optical elements are disposed may further vary according to the radial distance from the optical center of said lens element.

According to some embodiments, at least part, for example all, of the optical elements have a varying optical power and a continuous first derivative between two contiguous optical elements. According to some embodiments, at least part, for example all, of the optical elements have a constant optical power and a discontinuous first derivative between two contiguous optical elements.

The optical elements can be made using different technologies such as non limitatively direct surfacing, molding, casting, injection, embossing, filming, or photolithography.

According to some embodiments, the plurality of optical elements is positioned as detailed in WO2019/166659. According to some embodiments, the plurality of optical elements is positioned along a plurality of concentric rings.

According to some embodiments, the lens element comprises at least four optical elements organized in at least two groups of contiguous optical elements.

According to some embodiments, each group of contiguous optical element is organized in at least two concentric rings having the same center, the concentric ring of each group of contiguous optical element being defined by an inner diameter corresponding to the smallest circle that is tangent to at least one optical element of said group and an outer diameter corresponding to the largest circle that is tangent to at least one optical element of said group.

According to some embodiments, at least part of, for example all the concentric rings of optical elements are centered on the optical center of the surface of the lens element on which said optical elements are disposed.

According to some embodiments, the concentric rings of optical elements have a diameter comprised between 9.0 mm and 60 mm. According to some embodiments, considering an annular zone of the lens element having an inner diameter greater than 9 mm and an outer diameter smaller than 57 mm, having a geometrical center located at a distance of the optical center of the lens element smaller than 1 mm, the ratio between the sum of areas of the parts of optical elements located inside said circular zone and the area of said circular zone is comprised between 20% and 70%, preferably between 30% and 60%, and more preferably between 40% and 50%.

According to some embodiments, the distance between two successive concentric rings of optical elements is greater than or equal to 2.0 mm, 3.0 mm or 5.0 mm, the distance between two successive concentric rings being defined by the difference between the inner diameter of a first concentric ring and the outer diameter of a second concentric ring, the second concentric ring being closer to the periphery of the lens element. Advantageously, having the distance between two successive concentric rings of optical elements greater than 2.00 mm allows managing a larger refraction area between these rings of optical elements and thus provides better visual acuity.

According to some embodiments, the lens element comprises optical elements disposed in at least 2 concentric rings, preferably more than 5, more preferably more than 10 concentric rings. For example, the optical elements may be disposed in 11 concentric rings centered on the optical center of the lens. The optical power and/or cylinder of the micro-lenses may be different depending on their position along the concentric rings.

According to some embodiments, the optical elements are configured so that along at least one section of the lens the mean sphere of optical elements increases from a point of said section towards the peripheral part of said section.

According to some embodiments, the optical elements are configured so that along at least one section of the lens the cylinder of optical elements increases from a point of said section towards the peripheral part of said section.

According to some embodiments, the optical elements are configured so that along the at least one section of the lens the mean sphere and/or the cylinder of optical elements increases from the center of said section towards the peripheral part of said section.

According to some embodiments, the refraction area comprises an optical center and the optical elements are configured so that along any section passing through the optical center of the lens the mean sphere and/or the cylinder of the optical elements increases from the optical center towards the peripheral part of the lens.

According to some embodiments, the refraction area comprises a far vision reference point, a near vision reference point, and a meridian joining the far and near vision reference points, the optical elements are configured so that in standard wearing conditions along any horizontal section of the lens the mean sphere and/or the cylinder of the optical elements increases from the intersection of said horizontal section with the meridian towards the peripheral part of the lens.

According to some embodiments, the mean sphere and/or the cylinder increase function along the sections are different depending on the position of said section along the meridian.

According to some embodiments, the mean sphere and/or the cylinder increase function along the sections are unsymmetrical.

According to some embodiments, the optical elements are configured so that in standard wearing conditions the at least one section is a horizontal section.

According to some embodiments, the mean sphere and/or the cylinder of optical elements increases from a first point of said section towards the peripheral part of said section and decreases from a second point of said section towards the peripheral part of said section, the second point being closer to the peripheral part of said section than the first point.

According to some embodiments, the mean sphere and/or the cylinder increase function along the at least one section is a Gaussian function.

According to some embodiments, the mean sphere and/or the cylinder increase function along the at least one section is a Quadratic function.

According to some embodiments, the optical elements are configured so that the mean focus of the light rays passing through each optical element is at a same distance to the retina.

According to some embodiments, the refractive area is formed as the area other than the areas formed as the plurality of optical elements.

According to some embodiments, for every circular zone having a radius comprised between 2 and 4 mm comprising a geometrical center located at a distance of the optical center of the lens element greater or equal to said radius +5 mm, and smaller than or equal to 15 mm, for example smaller than or equal to 10 mm, the ratio between the sum of areas of the parts of optical elements located inside said circular zone and the area of said circular zone is comprised between 20% and 70%, preferably between 30% and 60%, and more preferably between 40% and 50%.

According to some embodiments, at least one of the optical elements is a multifocal refractive micro-lens.

According to some embodiments, the at least one multifocal refraction micro-lens comprises a cylindrical power.

According to some embodiments, the at least one multifocal refractive micro-lens comprises an aspherical surface, with or without any rotational symmetry.

According to some embodiments, at least one of the optical elements is a toric refractive micro-lens.

According to some embodiments, the at least one multifocal refractive micro-lens comprises a toric surface.

According to some embodiments, at least one of the optical elements is made of a birefringent material.

According to some embodiments, at least one of the optical elements is a diffractive lens.

According to some embodiments, the at least one diffractive lens comprises a metasurface structure.

According to some embodiments, at least one optical element has a shape configured so as to create a caustic in front of the retina of the eye of the person. In other words, such optical element is configured so that every section plane where the light flux is concentrated if any, is located in front of the retina of the eye of the person.

According to some embodiments, at least one optical element is a multifocal binary component.

According to some embodiments, at least one optical element is a pixelated lens.

According to some embodiments, at least one optical element is a π-Fresnel lens.

According to some embodiments, at least part, for example all, optical functions comprise high order optical aberrations.

According to some embodiments, the lens element comprises an ophthalmic lens bearing the refraction area and a clip-on bearing the optical elements adapted to be removably attached to the ophthalmic lens when the lens element is worn.

According to some embodiments, the refraction area is further configured to provide to the wearer and, for example for foveal vision, a second optical power different from the first optical power.

According to some embodiments, the difference between the first optical power and the second optical power is greater than or equal to 0.5 diopter.

According to some embodiments, at least one, for example at least 70%, for example all optical elements are active optical element that may be activated by an optical lens controller.

According to some embodiments, the active optical element comprises a material having a variable refractive index whose value is controlled by the optical lens controller.

According to some embodiments, the optical elements are not visible on the lens element.

According to another aspect, the invention relates to a computer-implemented method for determining a lens element intended to be worn by a wearer, to provide a refractive power based on a prescription of the wearer for correcting an abnormal refraction of the eye of the wearer and to slow down the progression of an abnormal refraction of said eye of the wearer.

According to some embodiments, the lens element is a spectacle lens element intended to be worn in front of an eye of a wearer. According to some embodiments, the lens element is a contact lens element intended to be worn on an eye of a wearer.

According to some embodiments, the lens element is intended to provide a refractive power based on a prescription of the wearer for correcting an abnormal refraction of the eye of the wearer in standard wearing conditions.

The lens element comprises an optical microstructure having an optical function of not focusing an image on the retina of the eye of the wearer so as to slow down the progression of the abnormal refraction of the eye of the wearer.

According to some embodiments, the lens element comprises an optical microstructure having an optical function of not focusing an image on the retina of the eye of the wearer in standard wearing conditions so as to slow down the progression of the abnormal refraction of the eye of the wearer.

The method comprises the following steps:

providing a prescription of the wearer;

determining the optical microstructure so that the modulation transfer function, for example for foveal vision, is greater or equal to 0.07 over the range of spatial frequencies comprised from 10 to 25 cycles per degree, when measured through the optical microstructure for a pupil aperture of 4 mm centered at 6.6 mm from the optical center of the lens element.

According to some embodiments, the method further comprises the step of providing a wearing condition of the lens element by the wearer.

According to some embodiments, the method for determining the optical microstructures comprises:

a first step of defining initial parameters of the optical microstructure, a second step of determining parameters of the lens element to provide the prescription of the wearer; and a third step of optimizing the initial parameters so that the modulation transfer function, for example for foveal vision, when measured through the optical microstructure for a pupil aperture of 4 mm centered at 6.6 mm from the optical center of the lens element is greater or equal to 0.07 over the range of spatial frequencies comprised from 10 to 25 cycles per degree.

According to some embodiments, during the first step initial parameters of the optical microstructure are defined. Such initial parameters can be selected from the size of the optical microstructure, for instance the size of the optical elements, the optical properties of the optical microstructure, such as for instance spherical, non-spherical, spherico-cylindrical, aspherical, refractive, or diffractive optical elements, the ratio between the area of the optical microstructure and the area of the lens element, the position of the microstructure, such as the position of the optical elements in a network. The network may be a random network or a structured network, such as for instance a squared network, a hexagonal network, a triangle network, an octagonal network, a honeycomb, or concentric rings.

According to some embodiments, during the second step the material of the lens element with a known refractive index, the front surface and the back surface are determined so that the lens element provides the prescription of the wearer.

According to some embodiments, the front surface is spherical, aspherical or progressive.

According to some embodiments, the back surface is spherical cylindrical, aspherical, atorical or progressive.

According to some embodiments, during the third step the modulation transfer function, for example for foveal vision, is computed. If the modulation transfer function is not greater or equal to 0.07 over the range of spatial frequencies comprised from 10 to 25 cycles per degree, the initial parameters are iteratively modified until the modulation transfer function, for example for foveal vision, satisfies the threshold.

According to some embodiments, the optimization procedure is a constrained optimization procedure so that the optical microstructure further respects one of the following criteria.

According to some embodiments, the method further comprises the step of determining the optical microstructure so that the modulation transfer function, for example for foveal vision, is greater or equal to 0.10, 0.15, 0.20, 0.25, 0.30, 0.35, 0.40, 0.45, 0.50, 0.55 or 0.60 over the range of spatial frequencies comprised from 10 to 25 cycles per degree, when measured through the optical microstructure for a pupil aperture of 4 mm centered at 6.6 mm from the optical center of the lens element.

According to some embodiments, the method further comprises the step of determining the optical microstructure so that the modulation transfer function, for example for foveal vision, is greater or equal to 0.15, 0.20, 0.25, 0.30, 0.35, 0.40, 0.45, 0.50, 0.55, 0.60 or 0.65 over the range of spatial frequencies comprised from 10 to 15 cycles per degree, when measured through the optical microstructure for a pupil aperture of 4 mm centered at 6.6 mm from the optical center of the lens element.

According to some embodiments, the method further comprises the step of determining the optical microstructure so that the modulation transfer function, for example for foveal vision, is greater or equal to 0.07, 0.10, 0.15, 0.20, 0.25, 0.30, 0.35, 0.40, 0.45, 0.50; 0.55 or 0.60 over the range of spatial frequencies comprised from 20 to 25 cycles per degree, when measured through the optical microstructure for a pupil aperture of 4 mm centered at 6.6 mm from the optical center of the lens element.

According to some embodiments, the method further comprises the step of determining the optical microstructure so that the modulation transfer function, for example for foveal vision, is greater or equal to 0.70, 0.75, 0.80, 0.85, 0.90 over the range of spatial frequencies comprised from 0.5 to 3 cycles per degree, when measured through the optical microstructure for a pupil aperture of 4 mm centered at 6.6 mm from the optical center of the lens element.

According to some embodiments, the method further comprises the step of determining the optical microstructure so that the modulation transfer function, for example for peripheral vision, is lower or equal to 0.8, 0.75, 0.7, 0.65, 0.6, 0.55, 0.5, 0.45, 0.4, 0.35 or 0.3 over the range of spatial frequencies comprised from 3 to 7 cycles per degree, when measured through the optical microstructure for a gaze direction of 0°, for a ray direction of 15° and for a pupil aperture of 4 mm or when measured through the optical microstructure for a pupil aperture of 4 mm centered at 6.6 mm from the optical center of the lens element.

According to some embodiments, the method further comprises the step of determining the optical microstructure so that the modulation transfer function, for example for peripheral vision, is lower or equal to 0.8, 0.75, 0.7, 0.65, 0.6, 0.55, 0.5, 0.45, 0.4, 0.35 or 0.3 at a spatial frequency of 3 cycles per degree, when measured for a gaze direction of 0°, for a ray direction of 15° and for a pupil aperture of 4 mm or when measured through the optical microstructure for a pupil aperture of 4 mm centered at 6.6 mm from the optical center of the lens element.

According to some embodiments, the method further comprises the step of determining the optical microstructure so that the modulation transfer function, for example for peripheral vision, is lower or equal to 0.7, 0.65, 0.6, 0.55, 0.5, 0.45, 0.4, 0.35, 0.3, 0.25 or 0.2 at a spatial frequency of 4 cycles per degree, when measured for a gaze direction of 0°, for a ray direction of 15° and for a pupil aperture of 4 mm when measured through the optical microstructure for a pupil aperture of 4 mm centered at 6.6 mm from the optical center of the lens element.

According to some embodiments, the method further comprises the step of determining the optical microstructure so that the modulation transfer function, for example for peripheral vision, is lower or equal to 0.4, 0.35, 0.3, 0.25 or 0.2 at a spatial frequency of 7 cycles per degree, when measured for a gaze direction of 0°, for a ray direction of 15° and for a pupil aperture of 4 mm or when measured through the optical microstructure for a pupil aperture of 4 mm centered at 6.6 mm from the optical center of the lens element.

According to some embodiments, the method further comprises the step of determining the optical microstructure so that the modulation transfer function, for example for peripheral vision, is greater or equal to 0.15, 0.20, 0.25, 0.30, 0.35, 0.40, 0.45, 0.50, 0.55, 0.60, 0.65 or 0.70 over the range of spatial frequencies comprised from 10 to 20 cycles per degree, when measured for a gaze direction of 0°, for a ray direction of 15° and a pupil aperture of 4 mm or when measured through the optical microstructure for a pupil aperture of 4 mm centered at 6.6 mm from the optical center of the lens element.

According to some embodiments, the method further comprises the step of determining the optical microstructure so that the modulation transfer function, for example for peripheral vision, is greater or equal to 0.30, 0.35, 0.40, 0.45 or 0.50 at a spatial frequency of 10 cycles per degree, when measured for a gaze direction of 0°, for a ray direction of 15° and for a pupil aperture of 4 mm or when measured through the optical microstructure for a pupil aperture of 4 mm centered at 6.6 mm from the optical center of the lens element.

According to some embodiments, the method further comprises the step of determining the optical microstructure so that the modulation transfer function, for example for peripheral vision, is greater or equal to 0.15, 0.20, 0.25, 0.30, 0.3 or 0.40 at a spatial frequency of 20 cycles per degree, when measured for a gaze direction of 0°, for a ray direction of 15° and for a pupil aperture of 4 mm or when measured through the optical microstructure for a pupil aperture of 4 mm centered at 6.6 mm from the optical center of the lens element.

In the description, terms like «up», «bottom», «horizontal», «vertical», «above», «below», «front», «rear» or other words indicating relative position may be used. These terms are to be understood in the wearing conditions of the lens element.

In the context of the present invention, the term "lens element" can refer to an uncut optical lens or a spectacle optical lens edged to fit a specific spectacle frame or an ophthalmic lens.

While various embodiments have been described and illustrated, the details description and drawings should not be considered as restrictive but merely exemplary and illustrative. Various modifications can be made to the embodiments by those skilled in the art without departing from the scope of the disclosure as defined by the claims. In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A lens element to be worn by a wearer and to provide a refractive power based on a prescription of the wearer for correcting an abnormal refraction of the eye of the wearer, the lens element comprising:

an optical microstructure having an optical function of not focusing an image on a retina of the eye of the wearer to slow down progression of the abnormal refraction of the eye of the wearer, wherein a modulation transfer function of the lens element is greater or equal to 0.07 over a range of spatial frequencies comprised from 10 to 25 cycles per degree, when measured through the optical microstructure for a pupil aperture of 4 mm centered at 6.6 mm from the optical center of the lens element, for a gaze direction of 15° downwards, and a light beam arriving normal to the surface of the lens element.

2. The lens element according to claim 1, wherein the modulation transfer function of the lens element is greater or equal to 0.10.

3. The lens element according to claim 1, further comprising a refractive area configured to provide the refractive power based on the prescription of the wearer for correcting the abnormal refraction of the eye of the wearer.

4. The lens element according to claim 1, wherein the optical microstructure has an additional optical function of providing the refractive power based on the prescription of the wearer for correcting the abnormal refraction of the eye of the wearer.

5. The lens element according to claim 1, wherein the modulation transfer function is greater or equal to 0.15 over the range of spatial frequencies comprised from 10 to 15 cycles per degree, when measured through the optical microstructure for a pupil aperture of 4 mm centered at 6.6 mm from the optical center of the lens element.

6. The lens element according to claim 5, wherein the modulation transfer function is greater or equal to 0.25.

7. The lens element according to claim 1, wherein the modulation transfer function, for foveal vision, is greater or equal to 0.07 over the range of spatial frequencies comprised from 20 to 25 cycles per degree, when measured through the optical microstructure for a pupil aperture of 4 mm centered at 6.6 mm from the optical center of the lens element.

8. The lens element according to claim 7, wherein the modulation transfer function, for foveal vision, is greater or equal to 0.10.

9. The lens element according to claim 1, wherein the modulation transfer function, for foveal vision, is greater or equal to 0.85 over the range of spatial frequencies comprised from 0.5 to 3 cycles per degree, when measured through the optical microstructure for a pupil aperture of 4 mm centered at 6.6 mm from the optical center of the lens element.

10. The lens element according to claim 9, wherein the modulation transfer function, for foveal vision, is greater or equal to 0.85.

11. The lens element according to claim 1, wherein the modulation transfer function, for foveal vision, is a horizontal modulation transfer function or a vertical modulation transfer function.

12. The lens element according to claim 1, wherein the optical microstructure is disposed on an object-side surface and/or an eye-side surface and/or between the object-side surface and the eye-side surface of the lens element.

13. The lens element according to claim 12, further comprising a coating on the object-side surface and/or the eye-side surface.

14. The lens element according to claim 1, wherein the optical microstructure comprises a plurality of optical elements, including micro-lenses.

15. The lens element according to claim 14, wherein the plurality of optical elements is positioned in a network, including a grid, a honeycomb, or concentric rings.

16. The lens element according to claim 1,
wherein the modulation transfer function of the lens element, for foveal vision, is measured through a surface of the lens element, and
wherein the optical microstructure covers greater than or equal to 20% of the surface.

17. The lens element according to claim 16, wherein the optical microstructure covers greater than or equal to 40% of the surface.

18. The lens element according to claim 1, wherein the modulation transfer function of the lens element, for peripheral vision, is less than or equal to 0.8 over the range of spatial frequencies comprised from 3 to 7 cycles per degree, when measured for a pupil aperture of 4 mm centered at 6.6 mm from the optical center of the lens element.

19. The lens element according to claim 1, wherein the modulation transfer function, for peripheral vision, is greater or equal to 0.15 over the range of spatial frequencies comprised from 10 to 20 cycles per degree, when measured for a pupil aperture of 4 mm centered at 6.6 mm from the optical center of the lens element.

20. A computer-implemented method for determining a lens element to be worn by a wearer, to provide a refractive power based on a prescription of the wearer for correcting an abnormal refraction of the eye of the wearer and to slow down progression of an abnormal refraction of said eye of the wearer,
the lens element comprising an optical microstructure having an optical function of not focusing an image on a retina of the eye of the wearer to slow down the progression of the abnormal refraction of the eye of the wearer; and
the method comprising the following steps:
providing a prescription of the wearer, and
determining the optical microstructure so that the modulation transfer function is greater or equal to 0.07 over a range of spatial frequencies comprised from 10 to 25 cycles per degree, when measured through the optical microstructure for a pupil aperture of 4 mm centered at 6.6 mm from the optical center of the lens element, for a gaze direction of 15° downwards, and a light beam arriving normal to the surface of the lens element.

* * * * *